3,809,778
PROCESS FOR THE COMPLETE UTILIZATION OF COCOA FRUITS
Ulla Drevici and Noe Drevici, both of 100 Central
Park S., New York, N.Y. 10019
No Drawing. Filed July 23, 1971, Ser. No. 165,396
Int. Cl. A23l 1/00
U.S. Cl. 426—481                    11 Claims

ABSTRACT OF THE DISCLOSURE

Valuable products are obtained from Theobroma fruits by preferably removing the peels from said fruits, opening the fruits, separating the seeds from the preferably peeled parenchymatous part of the fruits, and immediately thereafter fermenting the seeds and processing said parenchymatous part. Preferably the fruits are pretreated, for instance, with an alkaline solution and, after peeling, are neutralized, or they are pretreated with a preserving agent. The parenchymatous part of the fruits is expressed to yield the fruit flesh juice containing a hydrocolloid which has proved to be a valuable emulsifying, thickening, stabilizing, suspending agent and protective colloid. The expressed Theobroma fruit flesh is converted into a nutritious animal feed, especially for small animals. Thus the Theobroma fruits are substantially completely utilized.

BACKGROUND OF THE INVENTION

(1) Field of the invention

The present invention is concerned with the utilization of the cocoa fruit and more particularly with its complete utilization with the purpose of producing valuable products such as novel, highly nutritious, salubrious, and tasteful feed compositions for domestic animals and especially for small animals such as chicken, rabbits and others, and to products and feed compositions produced thereby.

(2) Description of the prior art

To increase stock-farming and cattle-breeding in tropical countries is of the greatest importance in the fight against malnutrition and hunger and will become of even greater importance due to the enormous increase in the world's population which can be expected within the next decades, especially in underdeveloped countries. To utilize additional acreage for cultivating and growing tuberous plants, grain, and other farm products is one way of increasing the available food supply. Another way is to improve the food value by feeding such farm products to domestic animals. This has the advantage that the resulting food is richer in protein. Its production, however, requires more time and is rather expensive. Access to additional sources of food is such an urgent matter that it is not possible to utilize the newly developed acreage for producing animal feed. Such acreage should better be used for growing and harvesting crops such as cereals which can directly be made available for human consumption. Therefore, in the initial stage of producing more food for the world's population it must be endeavored to provide and utilize to the greatest possible extent agricultural and industrial waste products for feeding cattle and other domestic animals. Especially agricultural waste products which are readily available at present and which usually are obtainable in large amounts and of a uniform quality, should be employed as animal feed. This is of the greatest importance in the tropics where every effort should be made to feed domestic animals with such waste products. Keeping large herds of domestic animals in the tropics has been made possible by the achievements of modern veterinary medicine, immunology, etc. The only difficulty to overcome is the question of providing sufficient feed for the animals.

The pods of the Theobroma fruits are available in many places. Heretofore they were considered disagreeable waste products. They were obtained by opening the fruits by means of cutlasses, machetes, and the like, removing the seeds or beans with the pulp from the pod husks by means of a spoon-like instrument, and subjecting the beans to fermentation. The relatively high potassium content of the remaining pods allowed their utilization as fertilizer to enrich the soil to a certain extent with said element. However, the rotting pods become very rapidly a dreaded source of infection with brown rot, black pod rot, and other microorganisms which grow very well on the slimy pods. Their use as fertilizer, therefore, was not recommendable. The native population in the tropics sometimes dried the pods, ashed them, and used the resulting ash as soap substitute in a similar manner as wood ashes were previously used for laundering.

It is well known that near the places where the cocoa fruits have been opened and the empty cocoa fruit pods were piled, withering and dying of all trees near that place are to be expected. Therefore, the marketing boards in the cocoa growing countries advise their farmers to burn or to burry these parts of the cocoa fruit. This advice, however, is usually not followed by the farmers as it causes additional work without any apparent financial reward.

The cocoa beans taken out of the parenchymatous tissue of the cocoa fruits with the smeary and juicy cocoa pulp attached thereto are submitted to the so-called fermentation process which differs traditionally in the various areas of cocoa tree cultivation. In West Africa, for instance, the beans are placed in heaps on large leaves, usually banana or plantain leaves, in amounts of 50 kg. to 500 kg. and the heaps are covered with banana or plantain leaves. In other areas the cocoa beans are fermented in holes in the ground or placed in baskets, wooden boxes, or empty barrels. Sometimes the places where fermentation takes place are of a size that can be called "central fermentation plants." For starting fermentation or for transporting the beans with the pulp to such fermentation plants, the farmers collect a sufficiently large quantity of cocoa beans with the smeary pulp attached thereto. In South America the beans and pulp are transported to the central fermentation plants in baskets attached to the sides of mules. Due to the time which elapses between the opening of the fruits and the start of proper fermentation, i.e. the moment when the temperature necessary to kill the germ of the cocoa beans starts to rise, the manner of storing the beans during the collection, the effect of the weather which causes drying out of the pulp or its liquification, and other factors are responsible for the fermentation to start in a completely uncontrolled manner and sometimes not at all, differing from batch to batch and from day to day. Before the beans with the pulp reach the central fermentation plants many factors such as changes in temperature and duration of storage and transportation, humidity, the action of microorganisms, contamination and others, affect the fermentation so that it is quite impossible to carry out fermentation in an always uniform and controllable manner. This is the reason why, for instance, the farmers in Santo Domingo do not ferment their beans any more and, therefore, produce cocoa of varying and frequently inferior quality.

Up to now it was economically not feasible to transport the cocoa fruit as such, i.e. in the closed state to the fermentation plants because nine tenths of the weight of the cocoa fruit to be transported, namely the parenchymatous tissue thereof and the peels, simply had to be discarded as a waste product.

SUMMARY OF THE INVENTION

It is one object of the present invention to provide a novel and advantageous process of producing valuable products from all parts of the cocoa fruit in an economical and simple manner.

Another object of the present invention is to provide a novel and improved feed composition which is especially useful in feeding small animals such as rabbits, chicken, and the like, said feed composition being derived from cocoa fruits.

Still another object of the present invention is to provide a valuable texturizing agent which is useful in the food industry but also for technical and industrial purposes.

Other objects of the present invention and advantageous features thereof will become apparent as the description proceeds.

It is a principal feature of the present invention to make use of the parenchymatous tissue of the cocoa fruit in its unaltered state, i.e. before it has become dry and/or lignified or woody and/or has been attacked by fungi and other microorganisms.

To achieve this result, the unopened cocoa fruits are treated in such a manner that no contamination of the coccoa bean pulp and/or of the cocoa fruit flesh can take place and that immediately after opening the cocoa fruits the separated cocoa beans and adhering pulp are submitted, without delay, to a controllable and well adjusted fermentation process.

For this purpose the cocoa fruits are treated with an alkaline bath such as an alkali metal hydroxide or preferably alkali metal carbonate bath at a temperature between about 50° C. and about 100° C. for a short period of time. Thereafter, the alkaline-treated fruits are passed through a heating zone, preferably through an infrared heated channel. The alkaline treatment at 50–100° C. for a short period of time causes the cocoa fruits to swell to a certain extent. This swelling facilitates subsequent removal of the outer layers of the fruit such as the peel. These outer layers are removed, for instance, by means of scrapers, knives, rollers, rubber discs, or the like means which rub off the peel. The preferred means of this type are rubber discs rotating at a high velocity. After the outer peel has been removed in this manner, the remaining fruit is neutralized and the action of enzymes on the fruit is reduced or completely eliminated by treating the fruits with a suitable acid, preferably an edible acid, such as citric acid, malic acid, tartaric acid, ascorbic acid, and the like edible acids. Phosphoric acid and hydrochloric acid may also be used. Treatment with sulfur dioxide is also possible and frequently of considerable advantage. The amount of acid added is such that the pH-value of the treated cocoa fruit is below a pH of 7.0 and preferably at a pH between about 5.0 and 6.0. Removal of the peels before further treatment of the cocoa fruit flesh and the pulp is an essential feature of the present invention because thereby noxious and damaging microorganisms are also removed so that the parenchymatous tissue can subsequently be utilized in a hygienic manner. Removal of the peels has the further advantage that the color of the resulting products is improved and no contamination of the final products by woody parts takes place.

After neutralization the neutralized or slightly acidified fruits are mechanically opened to remove the cocoa beans with the adhering pulp. Mechanical opening of the fruits is effected in suitable machines which do not cause damage to the beans, i.e. machines which effect bursting of the peeled fruits, for instance, by causing the peeled fruits to drop onto special devices by which they are passed through pressure rolls, crushers with jaws, conical drums, and the like apparatus capable of bursting the peeled fruits. Thereby the cocoa fruit flesh is separated from the cocoa beans with the adherent pulp by kind of a whirling treatment. For this purpose, the peeled cocoa fruits are placed, for instance, into an inclined rotating drum with perforated walls through which, preferably, a gas current, for instance, an air current is passed. The cocoa beans with the adhering pulp drop through the perforations while the fruit flesh remains in the rotating drum and is discharged therefrom, and the cocoa beans with the adhering pulp are immediately transported, while still warm, to the fermentation silos. Preferably they are placed on heated screw or worm conveyors. Or they are conveyed by means of a gas stream under pressure, such as compressed air of the required predetermined moisture content, and at the required temperature to the fermentation silos. While the cocoa beans with the pulp are conveyed in this manner to the silos, the necessary chemical, physical, enzymological, bacteriological, and other control tests are carried out at predetermined time intervals and, if required, necessary additives, such as carbohydrates, acids, nutrients, yeast, trace elements, or compositions containing such additives are admixed to the beans so as to introduce into the fermentation silos agents which will ensure adequate and controlled fermentation.

The cocoa fruit flesh without the peels which has been separated in this manner from the beans and adhering pulp is passed into a disintegrator or a cutting machine and is further processed depending upon the purpose for which this material is to be used. Thus it may be subjected to the action of filter presses, centrifuges, steaming apparatus, mixing containers, and the like.

An especially valuable use of such cocoa fruit flesh especially in the dried state is the use as feed composition for animals. However, dried and ground cocoa fruit flesh as such cannot be used satisfactorily as feed for small animals such as rabbits and chicken. Since such animals are usually kept by the population in underdeveloped countries, especially in the tropics, there is a great need for supplying the framer, especially in the tropical rain forest, with a valuable feed composition useful especially for small animals, which composition comprises the parenchymatous tissue of the cocoa fruit, i.e. its fruit flesh.

According to the present invention the parenchymatous tissue of the cocoa fruit obtained as described hereinabove after separating the peels, opening the fruits, and removing the flesh from the cocoa beans with the adhering pulp, is especially useful as feed for small animals. For this purpose, the resulting cocoa fruit flesh which is obtained in this process in large size pieces is comminuted so as to form small rod-like pieces of a width and a length of a few millimeters. Of course, the cocoa fruit flesh pieces can also be coarsely comminuted in any suitable type of disintegrator. The comminuted pieces are then pressed out in a fruit juice press whereby a liquid juice is separated.

According to a specific embodiment of this invention the comminuted small rod-like pieces are exposed to the action of steam. They can also be subjected to the action of preferably acid extraction agents such as hydrochloric acid, sulfuric acid, and the like.

The residue remaining in the fruit juice press can be completely separated from the last amounts of residual liquid, for instance, by washing by means of brushing apparatus or by centrifuging. It is advisable to remove all slimy and gummy components from the resulting small cocoa fruit flesh pieces, because it is then possible to dry the residue to a friable material.

Tests with rabbits have shown that they accept readily such dried cocoa fruit flesh material as feed and that they show an increase in weight on prolonged feeding therewith.

The resulting cocoa fruit flesh material has also proved to be a satisfactory additive to chicken feed. In this manner the cocoa farmer is able to produce from cocoa fruit flesh a feed which can be used for feeding small domestic animals. Thereby use is made of a waste product the elimination of which is rather difficult and, heretofore, could not be carried out without damaging the cocoa plantations.

Furthermore, the viscous liquid expressed from the cocoa fruit flesh as described hereinabove which amounts to more than 50% of the fruit flesh can be purified by chemical and physico-chemical processes so that it is obtained in the form of a clear and transparent liquid which is odorless, colorless, and completely free of any solid impurities. Due to its valuable chemical and physical properties the cocoa fruit flesh juice can be used advantageously in the preparation of victuals. It can replace the known vegetable gums and has all the properties of such gums as they are desired by the consumer, producer, and salesman. The cocoa fruit flesh juice can be used, for instance, as additive to facilitate the manufacture of food products and to simplify their preparation, to eliminate the risks of faulty manufacture, and/or to render the manufacturing processes more economical.

The aid and additive obtained according to the present invention from cocoa fruit flesh juice is characterized by the following properties. It has surprisingly high stabilizing effect upon suspensions and emulsions. It is capable of binding water. It imparts a high viscosity to products to which it has been admixed and affects their texture favorably. It preserves the aroma, odor, and/or color in products to which it has been added, and/or it improves the rheological properties of various substances and preparations. The cocoa fruit flesh juice obtained according to the present invention can advantageously be incorporated into skimmed milk margarine, fruit juices, lemonades, fruit and vegetable puree, and others and can be used in the manufacture of beer, bakery and pastry products, mayonnaise, salad dressings, ketchup, potato chips, alimentary pastes such as noodles and macaroni, and others.

It can be added with great advantage to preparations to be spray-dried or roller-dried and has proved to be useful in the manufacture of aromatic preparations in powder form, for preserving the activity of vitamins, in the preparation of starch, sirups, gelled products, such as puddings, thickened soups and drinks, deep-frozen dishes, whipped and porridge-like products, such as potato puree, fish pastes, sausages, and in general in the preparation of all products which require a protective colloid, increased viscosity of the aqueous phase, a thickening and stabilizing effect upon suspensions and emulsions, in preventing the drying out of pastes or creams due to loss of water, in retarding or preventing the formation of ice crystals, in the preservation or aroma and color, and for many other purposes.

A number of similar manufacturing aids and additives are known such as tragacanth, carboxymethylcellulose, alginates, gum arabic, quince mucilage, carob bean flour, carageen, agar, pectins, and the like. Heretofore, however, the juice of cocoa fruit flesh in liquid and solid form has not been prepared, nor has its use for a similar purpose been suggested. The cocoa fruit flesh juice has in some instances advantages over the known vegetable gums and mucilages while in other instances it is at least equal to the known products. Furthermore, with some of them it produces synergistic effects when used together therewith. Not only for this reason but also because a noteworthy reduction in price is achieved when making use of the cocoa fruit flesh juice according to the present invention in combination with agar, carboxymethylcellulose, gelatin and other solutions. It is understood that the cocoa fruit flesh juice according to this invention can be used in liquid form as well as in solid form, in the purified state or not completely purified, in concentrated or dilute solution, and in any other form as additive to food products or in the manufacture of food products to achieve the desired effect. Its main advantage over similar agents used for the same purpose is its cheapness. All the known manufacturing aids and additives of this type are produced as the main product in a separate operation or plants must be cultivated for producing such agents or must be collected. For instance, gum arabic must be collected; alginates must be recovered from maritime algae; agar likewise; pectin must be produced by complicated processes from apples or citrus fruit peels; carboxymethylcellulose must be obtained by chemical reaction from wood; starch must be obtained from carbohydrate-containing products and gelatin from protein-containing products and the like. In contrast thereto the cocoa fruit flesh juice is obtained as a by-product in the production of cocoa beans and in working up the cocoa fruit flesh to feed preparations for small animals. It has been considered heretofore as a valueless waste product the destruction of which was rather expensive and had a damaging effect upon the cocoa tree plantations. The process of this invention now permits to recover a very inexpensive vegetable gum-like material from a waste product in large amounts since annually about 120 million tons of cocoa fruit flesh are accumulated in the world.

As stated above, the cocoa fruit flesh juice is preferably used after purification. Such purification can be effected by filtration, gel filtration, suspending it with polyamides, ion exchange agents, or other purifying plastic materials and chemical followed by allowing the treated juice to settle, by pasteurizing, sterilizing, centrifuging, freeze-drying, precipitating and re-dissolving, spray-drying, roller-drying and redissolving, reverse osmosis, electrophoresis, ion exchange reaction, and the like. Furthermore, the degree of viscosity of the resulting cocoa fruit flesh juice can be varied and adjusted as desired by concentrating the juice in a vacuum, by reverse osmosis, by changing its pH-value, by the addition of chemicals reacting therewith, and by any other suitable means.

According to another embodiment of the present invention the unopened cocoa fruits are placed into a bath containing a preservative and are dried after such a preserving pretreatment while still in the unopened state. Preferred preserving agents are sorbic acid, sulfur dioxide, chlorine, hypochlorite, or formaldehyde, although other agents can also be used provided they do not affect the taste and nutritive value of the pods. The partly or fully dried fruits are then opened and the seeds are removed whereafter the dried pods are ground and are passed through a roller mill together with a suitable fatty material. When proceeding in this manner the advantage is achieved that a large portion of the fruit flesh is also dried and is incorporated with its valuable components into the feed compositions.

The amount of fatty material added is calculated so that about 2% to 4% thereof is contained in the final feed composition. Various fatty materials can be used for admixture with the ground pods, such as suet, lard, acidified soapstock, vegetable oils, and others. The fatty material should be well stabilized, should be of low water content, and should have a low content of unsaponifiable matter.

The fat containing ground pods which represent the feed composition according to the present invention may be mixed with copra meal, rice bran, mineral salts, and/or other additives. Such mixtures are more readily accepted and much better utilized by and thus much better compatible to cattle than the feed composition without such admixtures.

The ground Theobroma pods produced and prepared as described hereinabove can also be used as chicken feed preferably after they have been pelletized. For this purpose it is of advantage to grind the Theobroma pods not too finely and to remove therefrom as much of its crude fiber content as possible by sieving the ground pods before the fat is added.

For certain feeding uses the protein content of the feed compositions according to the present invention may be substantially increased by suspending the Theobroma pod meal in water and adding thereto waste waters of food processing plants such as fish processing plants, dairies, slaughter houses, and the like which contain proteins in dissolved form. Said waste waters are adjusted by the addition of acids to the isoelectric point of the protein contained therein before they are added to the Theobroma pod suspension. Addition of the Theobroma pod suspension causes more rapid settling of the coagulated protein. Thereby the further advantage is achieved that the waste water protein is well mixed with the settling Theobroma pod meal because the high pectin content of the latter has an especially favorable effect upon protein precipitation. The resulting precipitate is separated from the liquid, for instance, by flotation and is then dried. It represents a highly valuable, protein-rich, nutritious additive to feedstuffs.

DESCRIPTION OF THE PREFERRED EMBODIMENTS

The following examples serve to illustrate the present invention without, however, limiting the same thereto.

Example 1

55 kg. of cocoa fruits are placed into a 30% potassium carbonate solution heated to a temperature of 70–75° C., said solution containing a wetting agent. The cocoa fruits are stirred in said solution for about 10 minutes. They are then passed through an infrared heating channel to an aggregate of brushes and of rubber discs rotating at a high velocity. Said aggregate causes rubbing off of the peels. Thereafter the peeled fruits are showered and dipped into a bath containing 10% citric acid and 5 g./liter of sulfur dioxide. As soon as the peeled fruits are neutralized, they are placed between the jaws of a squeezing device and are then passed through rotating rollers causing bursting and breaking open of the fruits to expose the beans with the pulp adhering thereto. The opened fruits are then introduced into rotating wire net drums wherein the beans with their adhering smeary pulp coating are separated from the parenchymatous tissue and drop through the perforations onto a heated screw or worm conveyor while the parenchymatous tissue remains in the rotating wire net drum. Preferably the beans with adhering pulp are freed from small amounts of contaminating cocoa bean flesh by means of vibrating screens arranged before the screw conveyors. In this manner about 10 kg. of cocoa beans with adhering pulp and 45 kg. of cocoa fruit flesh are obtained. The beans are mixed with suitable additives to insure proper and satisfactory fermentation. Such additives are, for instance, molasses which has been enriched by the addition of yeast. Fermentation is then carried out in the conventional manner.

In place of potassium carbonate solution, there can also be used sodium hydroxide solution preferably of a concentration between 15% and 30%. The duration of the alkali treatment is dependent upon the temperature at which it is carried out and the concentration of the alkaline agent. The higher the temperature and/or the higher the concentration of the alkaline agent, the shorter the duration of the alkaline treatment.

In place of 10% citric acid as used for washing and neutralizing the peeled cocoa fruits, there can be used other acids as mentioned hereinabove in a concentration from between about 5% and about 50%. Preferably sulfur dioxide in an amount between about 2 g./liter to about 10 g./liter is added to said solution.

Example 2

The cocoa fruit flesh obtained according to the preceding example is used as food for small animals. Rabbits received a mixture of 75% of cocoa fruit flesh obtained according to the present invention and 25% of barley for 10 days. The weight of the animals remained unchanged and amounted to 3,280 kg. per rabbit.

Thereafter the rabbits received a feed consisting of 100% of cocoa fruit flesh according to the present invention for 30 days. During the first 4 days the weight of the rabbits decreased to 2.800 kg. per rabbit but started to increase thereafter and amounted to 2.975 kg. per rabbit after 7 days, to 2.950 kg. per rabbit after 10 days, and to 2.970 kg. per rabbit after 30 days. When feeding thereafter the rabbits with a mixture of 80% of cocoa fruit flesh produced according to the present invention and 20% of barley, the weight of the rabbits increased after feeding for 3 days to an average weight of 3.045 kg. per rabbit. The loss in weight during the first days after changing the feed to a feed composition solely consisting of cocoa fruit flesh is due to the fact that the animals must become adjusted to the new feed.

The cocoa fruit flesh is composed as follows:

8% of water
9.2% of crude ash
0.7% of crude fat
5.1% of crude protein
40.0% of crude fiber
36.3% of nitrogen-free extractive agents
1.50 g./kg. of total phosphorus content
2.4 g./kg. of total phosphoric acid content
12.8 g./kg. of invert sugar
5.9 g./kg. of calcium
2.1 g./kg. of magnesium
17.7 g./kg. of sodium (determined by flame photometer)
11.2 g./kg. of potassium
34.1 mg./kg. of carotene
260 mg./kg. of vitamin C
1.31 mg./kg. of vitamin $B_1$
2.63 mg./kg. of vitamin $B_2$.

1000 g. of cocoa fruit flesh yield 1785 calories.

The amino content of the dried cocoa fruit flesh is as follows:

| | Percent |
|---|---|
| Lysine | 0.305 |
| Threonine | 0.107 |
| Valine | 0.159 |
| Methionine | 0.295 |
| Isoleucine | 0.154 |
| Leucine | 0.288 |
| Tyrosine | 0.054 |
| Phenyl alanine | 0.192 |
| Tryptophan | 0.016 |
| Histidine | 0.041 |
| Ammonia | 0.021 |
| Arginine | 0.007 |
| Aspartic acid | 0.297 |
| Glutamic acid | 0.396 |
| Serine | 0.315 |
| Proline | 0.077 |
| Glycine | 0.181 |
| Alanine | 0.177 |
| Cysteine | 0.055 |
| | 3.137 |

It is evident that all essential amino acids are present in the cocoa fruit flesh.

The feed preparation according to the present invention has also prooved of value as a mixture of chicken or generally poultry feed. Thus, the cocoa farmer is enabled by the present invention to produce a valuable feed material for his domestic animals from cocoa fruit flesh, i.e. from a waste material which heretofore could be eliminated with difficulty only.

The following examples serve to illustrate the use of cocoa fruit flesh juice as prepared according to the present invention for various purposes.

Example 3

Production of buttermilk margarine.—The cocoa fruit flesh juice is dissolved preferably in buttermilk and is then added to the margarine mixture composed of an edible oil, such as cotton seed oil, buttermilk, and salt. Preferably the cocoa fruit flesh juice is of high viscosity. A margarine mixture is, for instance, composed as follows:

1.25% of cocoa fruit flesh juice
80% of cotton seed oil
15.15% of buttermilk
3.0% of salt
0.6% of sodium benzoate.

The margarine production is carried out in a manner known per se.

The addition of cocoa fruit flesh juice serves as emulsifier and as stabilizer in place of lecithine, egg yolk, or other emulsifiers as conventionally used in margarine manufacture.

Example 4

Paste-like fruit essence.—30 g. of comminuted dried oranges are stirred into 300 g. of water and are then mixed with 80 cc. of almond essence. 350 g. of cocoa fruit flesh juice of a viscosity of 3,000 cps. are admixed thereto. The resulting paste-like fruit essence preparation is filled in the tubes.

Example 5

Preparation of dry potato chips of golden yellow color for deep freezing and subsequent use.—The raw potato chips are subjected to a blanching process at 85–90° C. for about 5 minutes whereby the potato chips are partly boiled, the enzymes are inactivated, and part of the natural sugar components are removed. The chips are then dipped into a sugar-containing solution to compensate for the loss of the sugar dissolved therefrom in the blanching process. Said sugar-containing solution has admixed thereto cocoa fruit flesh juice to impart thereto a viscosity of 100 cps. The temperature of said sugar containing solution is about 65° C. Thereafter, the sugar impregnated chips are fried in fat at 190° C. for one minute, the fat is allowed to drip off, the chips are packed, deep frozen, and stored.

Example 6

Brown sauce, stable on boiling, as additive to meat dishes.—The sauce is composed of 40.5% of cocoa fruit flesh juice,
46.9% of water,
3.8% of skimmed milk powder,
0.8% of salt,
0.3% of sugar,
7.0% of margarine,
0.3% of meat extract sold under the trademark "Maggi Fondor,"
0.3% of meat extract,
0.2% of onion aroma, and
2.0% of caramel.

The cocoa fruit flesh juice is heated to about 90° C. The skimmed milk powder is slowly stirred thereinto. Sugar, salt, margarine, "Maggi Fondor," meat extract, and caramel are slowly incorporated into the mixture while stirring. The viscosity of the resulting sauce can be adjusted by slowly adding the desired amount of water thereto. Preferably the resulting mixture is passed through a colloid mill, and is finally packed into plastic bags, rapidly deep-frozen, and stored. On defrosting and heating, a gravy is obtained which can be boiled repeatedly, if required.

The cocoa fruit flesh juice can be added to any liquid or fluid material to be applied, sprayed, or coated on any kind of surface. It can also be used in any dipping and the like process. It imparts to such a liquid or fluid increased viscosity so as to improve the properties of the products to which it is added. Any aqueous system benefits from the improved flow characteristics caused by the addition of cocoa fruit flesh juice. For instance, the combination of sugar, sirups, whether made from corn starch or by boiling sugar solutions, with cocoa fruit flesh juice produces considerable advantages on subsequent use of such sugar sirups.

The resulting sirup differs from a sirup to which no cocoa fruit flesh juice has been added, by not having the objectionable very sweet taste of sugar sirup although its viscosity is the same, and by producing an excellent mouth feel or taste sensation in the mouth from the food to which the sirup has been applied. It was found that one-third of the amount of starch in such sugar sirups can be replaced by the cocoa fruit flesh juice. As a result thereof the starchy taste or premature gelling effect of the starch is considerably reduced while the viscosity of the resulting starch product is increased.

The cocoa fruit flesh juice has proved to be useful as a stabilizing, emulsifying, suspending, and bodying agent. The viscosity of its aqueous solution is not affected by changes in temperature so that solutions prepared in the cold and used at increased temperature have essentially the same unchanged viscosity. Thus products marketed under different climatic conditions are free of changes in their consistency. The viscosity of cocoa fruit flesh juice is also not substantially changed when varying the pH-value of its solutions.

The vegetable hydrocolloid derived from cocoa fruit flesh juice differs from the known vegetable gums such as (a) exudates or saps of trees, for instance, karaya gum, tragacanth, gum arabic;
(b) extracts from seeds, for instance, locust bean gum, guar gum, quince seed gum;
(c) extracts from seaweeds, for instance, agar, Irish moss, kelp;

by its preparation; for it is expressed from the parenchymatous tissue of the cocoa fruit. Of course, it is also possible to extract the vegetable hydrocolloid from cocoa fruit flesh juice by suitable extracting agents.

Example 7

Salad dressing, dippings, or bread spreads of the Russian dressing type.—This preparation is composed as follows:

| | Percent |
|---|---|
| Vinegar | 12 |
| Water | 6.7 |
| Solid egg yolk | 1.5 |
| Sesame oil | 53.2 |
| Cocoa fruit flesh juice in powder form | 0.3 |
| Salt | 2.1 |
| Sugar | 12.0 |

The remainder consists of spices such as onion powder, mustard powder, and garlic powder.

Example 8

Salad dressing, dippings, bread spreads of the French dressing type.—This dressing is composed as follows:

| | Percent |
|---|---|
| Water | 31.5 |
| Cocoa fruit flesh juice in powder form | 0.9 |
| Sugar | 16.5 |
| Salt | 1.2 |
| Sesame oil | 34.3 |

Example 9

The cocoa fruit flesh juice is used in the tobacco industry as a binding agent in the manufacture of cigars and also in cut tobacco.

Example 10

The cocoa fruit flesh juice is added to dish washing liquids.

Example 11

The cocoa fruit flesh juice is incorporated in amounts up to 20% in gluten-poor flours of corn starch, wheat starch, or cassava starch. On baking, a crust similar to that of the crust of rye bread or wheat bread is produced from such a flour. The addition of cocoa fruit flesh juice has the further effect that the crust retains its freshness for a prolonged period of time and that the bread made from such starch flour has a better chewability or masticability than bread made from starch flour without the addition of cocoa fruit flesh juice. The dough is prepared in the conventional manner with the addition of baking powder or yeast.

Example 12

Cocoa fruit flesh juice added to flour and intimately mixed therewith produces baked goods similar to omelettes. It replaces the eggs partly or completely therein. For preparing such omelettes, the cocoa fruit flesh juice mixture with flour is poured into hot oil in a frying pan and is then baked.

For this purpose, for instance, 500 g. of cassava starch are beaten very thoroughly with 100 g. of water and 200 g. of cocoa fruit flesh juice with the addition of 75 g. of yeast, 50 g. of sugar, and 1.5 g. of salt. The yeast may be replaced by baking powder in an amount yielding about the same amount of carbon dioxide as yeast on heating. The resulting dough is put into a greased baking mold and is baked in a baking oven.

Example 13

The cocoa fruit flesh juice is added as creaming and thickening agent to rubber latex. Amounts of 0.2% to 0.5% by weight, calculated for the rubber concentrate solids, are added thereto and cause the natural rubber latex to separate into a layer containing more than 55% of rubber, within 24 hours.

Example 14

Cocoa fruit flesh juice can also be used to produce a milk substitute useful as coffee whitener. Such a milk substitute is composed as follows:

|   | Percent |
|---|---|
| Mixture of sodium caseinate and soybean caseinate | 3.0 |
| Lecithin | 0.8 |
| Sodium dihydrophosphate | 0.1 |
| Corn sirup | 7.5 |
| Cocoa fruit flesh juice | 2.0 |
| Sucrose | 7.5 |
| Water | up to 100 |

Example 15

A hair shampoo is obtained by mixing coconut oil with potassium carbonate and adding cocoa fruit flesh juice thereto in an amount of 4%.

Example 16

Glass cleaning detergent.—It is composed of a mixture of

|   | Percent |
|---|---|
| Sodium hydroxide in flakes | 85 |
| Hexasodium metaphosphate | 10 |
| Triethanolamine | 3 |
| Cocoa fruit flesh juice | 2 |

The resulting mixture represents a freely flowing detergent material.

Example 17

Toilet soap with a low fatty acid content.—The cocoa fruit flesh juice serves as plasticizer in toilet soaps with a low fatty acid content of not more than 5%.

Example 18

A cleaning composition is composed as follows:

|   | Kg. |
|---|---|
| Bentonite | 60 |
| Clay | 30 |
| Kaolin | 30 |
| Water | 12 |
| Cocoa fruit flesh juice | 14 |
| Sodium silicate | 1.5 |
| Sodium carbonate | 0.6 |
| Perfume | 1.5 |

Example 19

Hair decurling or straightening liquid. The liquid contains between 2% and 16%, by weight, of sodium sulfate,
between 1% and 12%, by weight, of thioglycolic acid or the triethanolamine salt of said acid, and
between 1% and 15%, by weight, of cocoa fruit flesh juice as fixing agent.

Example 20

Shaving soap.—

60 parts of soap,
20 parts of cocoa fruit flesh juice, and
20 parts of talcum are intimately mixed with each other. Preferably a potassium soap is used to yield a paste which can be shaped.

Example 21

Printing paste. — A conventional printing paste can be thickened by the addition of cocoa fruit flesh juice. The printing paste can be used not only for machine printing, but also for silk batik screen printing, and in other textile printing operations. The cocoa fruit flesh juice-containing printing paste gives sharp, not bleeding lines and contours. No plugging of the screen is encountered. The flow properties of the printing paste can be varied by the addition of a polyphosphate. After printing, residual printing paste can be removed easily by means of water. The cocoa fruit flesh juice is added to the printing paste in an amount between about 3% and about 10%.

Example 22

Use of cocoa fruit flesh juice in spinning and weaving.—Resistance against friction of the threads in textile fabrics, staple fiber, cotton fabric, and spun silk is considerably increased by using corn starch mixed with cocoa fruit flesh juice as finishing preparation.

Example 23

Cocoa fruit flesh juice can be added to paints based on siccative oils or drying oils, i.e. water colors in combination with such oils. The oil content is between about 5% and about 10%. A suitable paint is composed, for instance, as follows:

| Titanium dioxide | kg | 52 |
|---|---|---|
| Glue | kg | 6 |
| Cocoa fruit flesh juice | kg | 3 |
| Water | l | 24 |
| Phenolate | g | 100 |
| Sodium hexametaphosphate | g | 150 |
| Drying oil | g | 6.5 |

The paint is prepared by dissolving glue and the cocoa fruit flesh juice in water. Sodium hexametaphosphate and the preservative are added thereto. The pigment is boiled with part of the resulting solution. The oil is emulsified with the remainder of said solution. Thereafter, both parts are combined.

Example 24

1000 kg. of freshly harvested Theobroma fruits are placed in a vat containing 10,000 liters of a 5% aqueous solution of potassium sorbate and are gently stirred therein for about 30 minutes. The fruits are removed from the vat and are then kiln dried until they can be opened. After removal of the beans, the residual pods with the fruit flesh are ground and intimately mixed with 3 kg. of suet by repeatedly passing the mixture through a roller mill. The resulting mixture is a nutritious and tasty animal feed composition.

In place of potassium sorbate, there may be used other preservative agents such as 2% to 3% aqueous sodium or calcium hypochlorite or sodium or potassium disulfite solutions. Exposure of the fruits to a chlorine, sulfur dioxide or formaldehyde containing atmosphere may also be employed. These preservatives may also be used in aqueous solution. Other suitable preservatives are, for instance, ozone in a very low concentration such as 2 ml. per cu. m. of air, methyl formate, diphenyl, ammonia, sodium o-phenyl phenolate, nitrogen trichloride, and all preservatives and disinfectants used in processing fruit.

Example 25

The cocoa fruit flesh residue obtained after separating the cocoa beans with adhering pulp as obtained according to Example 1 hereinabove is placed into a curb press, as it is conventionally used in the production of cider or other fruit and vegetable juices, wherein it is enclosed in a cylinder, for instance, of perforated steel plate and is compressed by a solid ram. The fruit flesh juice escapes thereby through the walls of the cylinder and flows to collecting channels. The collected fruit juice is used either as such or after further purification and, if desired, concentration as plant hydrocolloid material in Examples 3 to 23 given hereinabove while the expressed cocoa fruit flesh is used in Example 2.

Other presses such as they are known to the art, for instance, box presses, potpresses, cage presses, or continuous screw presses can, of course, also be used.

Instead of expressing the cocoa fruit flesh obtained from peeled cocoa fruits according to Example 1, it is also possible to express the cocoa fruit flesh which still contains the peels as it is obtained according to Example 24 by first treating the unopened cocoa fruits with a preserving agent, opening them, removing the beans and adhering pulp, and grinding the remaining peels and fruit flesh.

It is, of course, also possible to use the expressed fruit flesh which still contains the peels as feed composition as described in Example 2 hereinabove, preferably after drying and comminuting the same. The results achieved by feeding such a feed material to rabbits are about the same as those achieved by feeding the material of Example 2, i.e. expressed cocoa fruit flesh without the peels.

We claim:

1. In the processing of cocoa fruits, said fruits being defined by an outer peel, a relatively much thicker layer of parenchymatous (fruit flesh) having an outer, epicarp layer and an inner, mesocarp layer, a cavity defined within said parenchymatous layer, a plurality of cocoa beans contained within said cavity and each of said beans having a surrounding layer of adhering pulp, said processing including opening the cocoa fruits, separating the cocoa beans with adhering pulp from the opened fruits and fermenting the cocoa beans with adhering pulp, the improvement which comprises the steps of
    (a) subjecting harvested cocoa fruits to a pretreatment comprising immersion thereof in an aqueous alkaline bath at a temperature between about 50° C. and about 100° C. to cause swelling, before the peels are removed from the thus pretreated unopened cocoa fruits,
    (b) removing the cocoa fruit peel to leave exposed the epicarp layer of the parenchymatous before opening the parenchymatous layer,
    (c) thereafter mechanically opening the parenchymatous layer, and
    (d) separating the cocoa beans with adhering pulp from the parenchymatous tissue.

2. The process of claim 1, further comprising the step of treating the peeled unopened cocoa fruits of step (b) with a neutralizing acid to impart thereto a pH between about 5.0 and about 7.0.

3. The process of claim 2, in which the neutralizing acid is an edible acid.

4. The process of claim 2, in which additionally a color conserving agent is added during neutralization.

5. The process of claim 4, in which the neutralizing acid is a color conserving acid.

6. The process of claim 5, in which the neutralizing and color conserving acid is ascorbic acid.

7. The process of claim 4, in which the color preserving agent is sulfur dioxide.

8. The process of claim 1, in which the separated parenchymatous part of the cocoa fruit is expressed and separated into cocoa fruit flesh juice and cocoa fruit flesh.

9. The process as defined by claim 1, wherein mechanical opening of the parenchymatous layer is effected by means causing bursting thereof.

10. The process of claim 9, in which the means causing bursting of the peeled cocoa fruits are pressure roller means through which the peeled cocoa fruits are passed to cause bursting and opening thereof without damaging the cocoa beans.

11. The process of claim 9, in which separation of the cocoa beans with adhering pulp from the parenchymatous part of the cocoa fruits is effected by passing the opened peeled cocoa fruits through an inclined rotating perforated drum whereby the cocoa beans with adherent pulp pass through the perforations while the parenchymatous part of the cocoa fruits remains therein and is discharged therefrom.

References Cited

UNITED STATES PATENTS

| 2,813,795 | 11/1957 | Hale | 99—23 |
| 2,824,810 | 2/1958 | Guadagni | 99—103 |

FOREIGN PATENTS

| 114,815 | 3/1942 | Australia | 99—26 |

OTHER REFERENCES

The Chemistry and Technology of Food and Food, pp. 485–7.

Products-Jacobs, 1951, Interscience, New York. pp. 1645–8.

Cocoa and Chocolate, Whymper Churchill, London, 1912, p. 37.

Feeds and Feeding—Morrison 22nd ed. Morrison Pub. Co. 1957, Itaca, N.Y. p. 499.

NORMAN YUDKOFF, Primary Examiner

H. H. BERNSTEIN, Assistant Examiner

U.S. Cl. X.R.

426—287, 171

PO-1050
(5/69)

UNITED STATES PATENT OFFICE
CERTIFICATE OF CORRECTION

Patent No. 3,809,778   Dated May 7, 1974

Inventor(s) ULLA DREVICI ET AL.

It is certified that error appears in the above-identified patent and that said Letters Patent are hereby corrected as shown below:

Column 5, line 21: After "has" insert -- a --.

Column 8, line 61: "prooved" should read -- proved --.

Column 12, line 53: "g. 6.5" should read -- kg. 6.5 --.

Signed and sealed this 17th day of September 1974.

(SEAL)
Attest:

McCOY M. GIBSON JR.
Attesting Officer

C. MARSHALL DANN
Commissioner of Patents